(12) United States Patent
Hooper

(10) Patent No.: US 7,248,584 B2
(45) Date of Patent: Jul. 24, 2007

(54) NETWORK PACKET PROCESSING

(75) Inventor: Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1080 days.

(21) Appl. No.: 10/214,987

(22) Filed: Aug. 7, 2002

(65) Prior Publication Data

US 2004/0028044 A1 Feb. 12, 2004

(51) Int. Cl.
*H04L 12/28* (2006.01)
(52) U.S. Cl. ..................................... 370/392
(58) Field of Classification Search ................ 370/392, 370/235, 229, 413, 230, 230.1, 351, 231, 370/395.53, 395.21, 395.32, 395.52, 468
See application file for complete search history.

(56) References Cited

U.S. PATENT DOCUMENTS 6,668,317 B1   12/2003  Bernstein et al.
6,798,743 B1 *  9/2004  Ma et al. ................... 370/235

OTHER PUBLICATIONS

"IXP1200 Network Processor", Software Reference Manual, Mar. 2000. Level One and Intel Company, Section 3, "Reference Design", pp. 3-1-3-30.
"Intel IXP1200 Network Processor Family", Hardware Reference Manual, Aug. 2001, "Technical Introduction", Section 2, pp. 17-49.
"Intel WAN/LAN Access Switch Example Design for the Intel IXP1200 Network Processor", Application Note, May 2001, pp. 1-20.
"ATM/OC-3 to Fast Ethernet IP Router Example Design", Intel Internet Exchange Architecture, 4 Pgs.
"WAN/LAN Access Switch Example Designed for the Intel IXP1200 Network Processor", Intel Internet Exchange Architecture, 4 Pgs.

* cited by examiner

*Primary Examiner*—Chi Pham
*Assistant Examiner*—Alexander O. Boakye
(74) *Attorney, Agent, or Firm*—Grossman, Tucker, Perreault & Pfleger, PLLC

(57) ABSTRACT

The disclosure includes description of techniques for processing a network packet received at a network device. An example of the technique includes, in a first path, performing packet processing phases upon the network packet and storing state data for the phase phases. A second path can access the state data stored by the first path and determine a phase to perform next.

28 Claims, 13 Drawing Sheets

```
GetPacket()
{
    .
    .
   ┌─ State.Phase = 0;
   │  State.Port = Packet.PortNumber;
   │  State.PacketAddress = Packet.PacketAddress;
112a  State.LinkLayerType = Packet.LinkLayerType;
    .
    .
}

HashLayer2()
{
    .
    .
   ┌─ State.Phase = 1;
112b  State.HashLayer2Value = HashValue;
    .
    .
}
```

110

FIG. 6

NETWORK PACKET PROCESSING

BACKGROUND

Networks enable computers and other devices to exchange data such as e-mail messages, web pages, audio, video, and so forth. To send data across a network, a sending device typically constructs a collection of packets. Individual packets store some portion of the data being sent. A receiver can reassemble the data into its original form after receiving the packets.

A packet traveling across a network may make many "hops" to intermediate network devices before reaching its final destination. Thus, much like a letter delivered by the post office, a packet includes data being sent and information used to deliver the packet. In technical terms, this information is often stored in the packet's "payload" and "header (s)", respectively. The header(s) may include information for a number of different communication protocols that define the information that should be stored in a packet. Different protocols may operate at different layers. For example, a low level layer generally known as the "link layer" coordinates transmission of data over physical connections. A higher level layer generally known as the "network layer" handles routing, switching, and other tasks that determine how to move a packet forward through a network.

Many different hardware and software schemes have been developed to handle packets. For example, some designs use software to program a general purpose CPU (Central Processing Unit) processor to process packets. Other designs, such as designs using components known as ASICs (application-specific integrated circuits), feature dedicated, "hardwired" approaches.

To combine the programmable flexibility of a CPU with the speed often associated with an ASIC, many vendors sell programmable devices known as network processors. Network processors enable software programmers to quickly reprogram network processor operations. Yet, due to their specially designed architectures, network processors can often rival the packet processing speed of an ASIC.

The versatility of network processors contributes to their appeal. Currently, network processors can be found in a variety of products including routers, switches, firewalls, line cards, and storage area network (SAN) components, among others.

BRIEF DESCRIPTION OF THE DRAWINGS

FIG. 6 is a source code listing of software instructions that save state data for different packet processing phases.

DETAILED DESCRIPTION

Network devices can perform a variety of operations on received packets. Among others, these operations can include looking up information based on the packet's contents and/or determining how to forward the packet to another network device. Devices perform these operations very quickly to keep up with the large volume of packets typically received. To improve performance, some devices provide different packet processing paths that feature different sets of computing resources. For example, resources associated with a "fast path" may process the bulk of ordinary data packets. However, the "fast path" may hand-off processing of a packet to a "slow path", for example, when the "fast path" cannot complete packet processing of a packet in a timely fashion. Parenthetically, while dubbed "fast" and "slow", these path names need not imply a particular difference in the processing speed of resources providing the paths.

FIGS. 1–4 illustrate a sample implementation of a technique that coordinates operation of different packet processing paths to potentially reduce unnecessary duplication of their packet processing efforts. In this implementation, packet processing operations are divided into a collection of packet processing phases 100a. The results of the phases 100a can be saved as processing proceeds. This can be thought of as "locking-in" intermediate processing results for a packet so that the results need not be recomputed. Another path 102b can use the saved data to continue the packet processing phases 100b approximately where a different path 102a left off.

Figure 1:
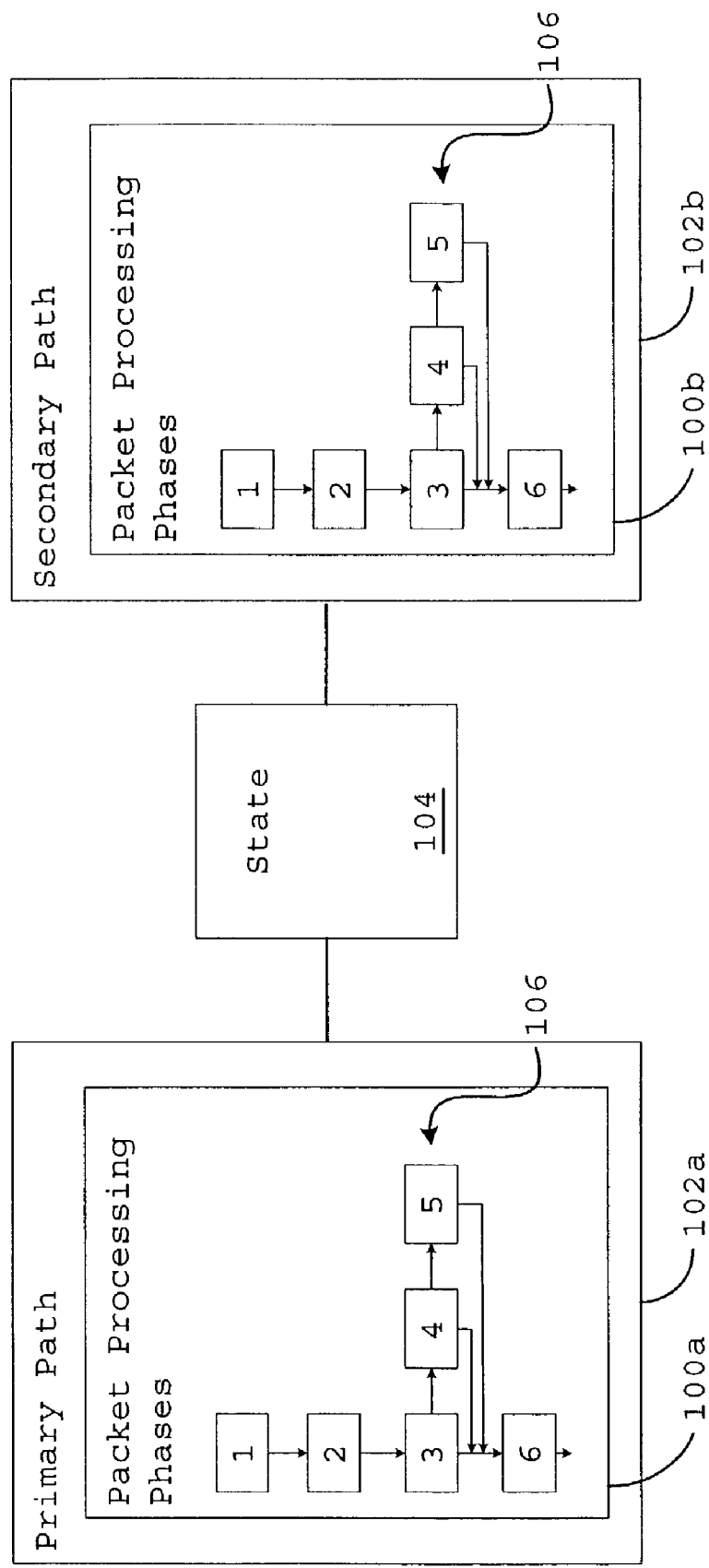
FIGS. 1–4 are diagrams illustrating coordination of packet processing performed by different processing paths.

In greater detail, as shown in FIG. 1, packet processing operations may be broken down into a collection of phases 100a (labeled "1" to "6"). As shown, the phases 100a may have logical relationships. For example, phases 100a have an ordering where a path 102a will perform phase "1" before phase "2".

Some phases (e.g., "1", "2", and "6") may take nearly the same amount of time for different packets. For example, extracting data from a packet's header will take roughly the same amount of time for most packets. Other operations, however, may be of variable duration for different packets. For instance, performing a lookup operation based on a packet's addresses may complete quickly for some packets, but may take longer for others. As shown, a variable length operation 106 may be divided into a collection of phases, though not each phase may be performed for a particular packet. For example, while a variable length operation 106 is shown as including phases "3", "4", and "5", the operation for a given packet may complete after phases "3" and "4". In such a case, processing can proceed to phase "6" without performing phase "5". The division of a variable duration operation into a set of conditionally performed phases is discretionary. That is, a single phase may replace phases "3", "4" and "5". Alternately, a given phase may be repeated (not shown). For example, if phases "3", "4" and "5" correspond to an iterative lookup operation, the phases could be replaced by a single repeatedly performed phase that updates the state data as the lookup proceeds.

As shown, the phases 100a may be identified by a number sequentially assigned to the phases based on a "worst-case" traversal of the phases. That is, the phases 100a may be numbered based on a scenario where all conditional phases are performed.

As shown, different paths 102a, 102b may be able to perform the same phases 100a, 100b. For example, a primary path 102a may proceed through the phases 100a saving state data 104 for the different phases 100a as processing progresses. This state data 104 may vary for different phases. For example, a phase that performs a hash upon packet header data may feature state data that includes the hash results. A phase that verifies packet contents, however, may feature state data that identifies verification exception codes.

Figure 2:
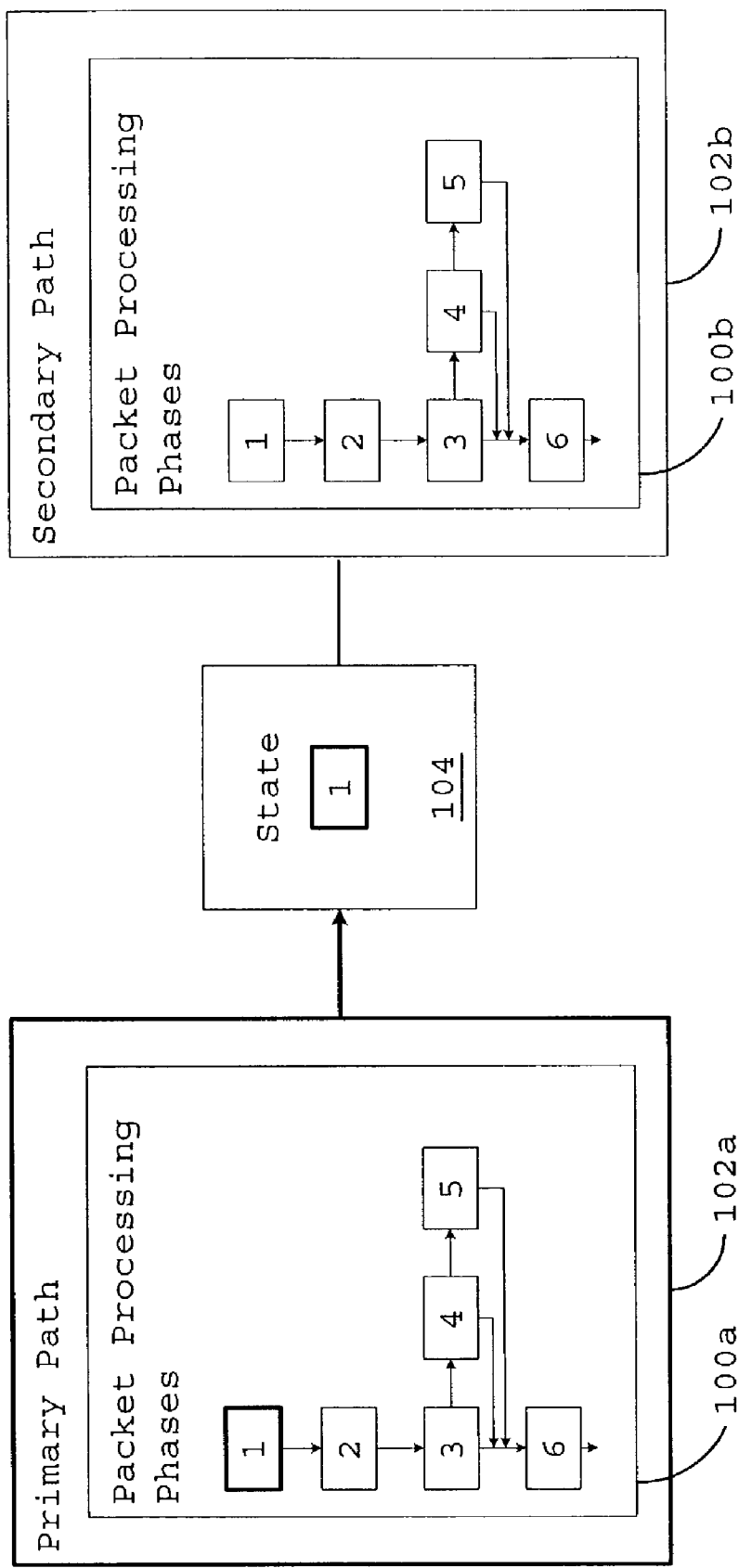
Figure 3:
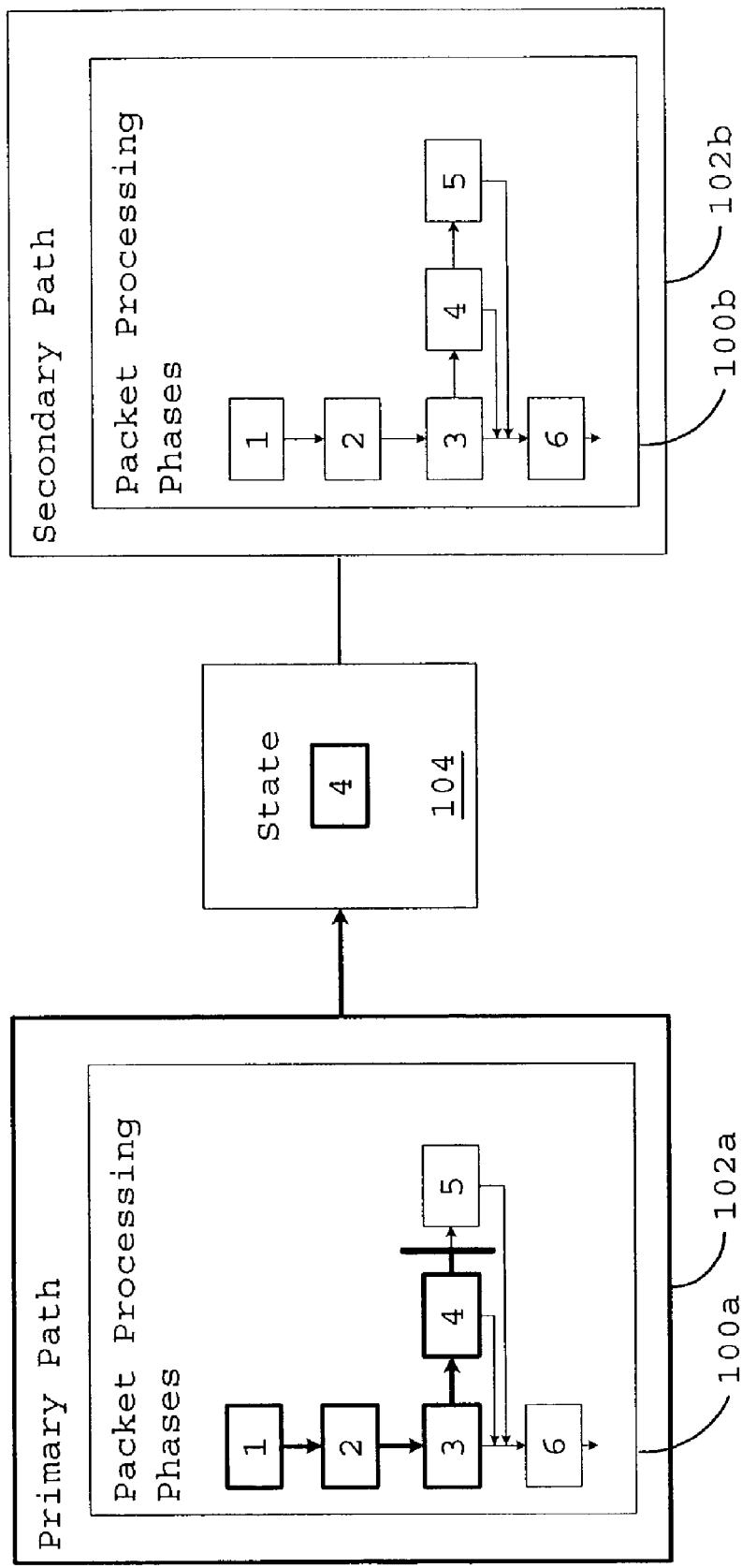
Figure 4:
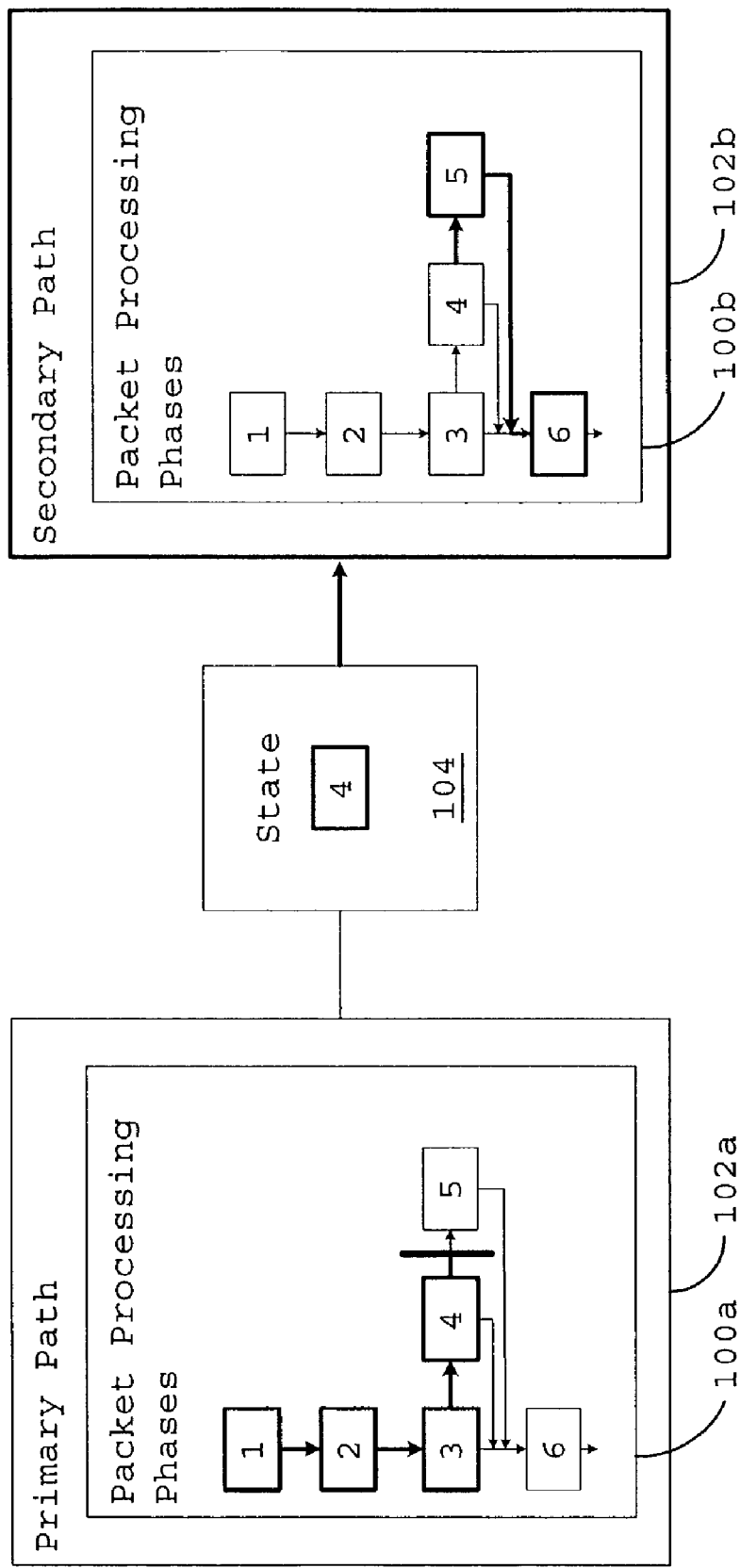

At some point, the primary path 102a may request processing assistance from the secondary path 102b. For example, the primary path 102a may exceed a time budget for processing the packet or determine that some event has occurred (e.g., a high priority packet has arrived). In response, the primary path 102a may queue processing of the packet by the secondary path 102b. To process the packet, the secondary path 102b may access the state data 104 to use the results of processing already performed by the primary path 102a and to determine where to resume performance of the phases 100b. FIGS. 2–4 illustrate an example of such operation.

As shown in FIG. 2, the primary path 100a performs packet processing phase "1" and saves corresponding state data 104. As shown in FIG. 3, the primary path 100a may continue performing subsequent phases (e.g., phases "2", "3" and "4") and saving the corresponding phase state data 104 for each phase. Potentially, the primary path 102a may cease packet processing before finishing the collection of phases (depicted as a vertical line between phases "4" and "5"). For example, the primary path 100a may exceed some dynamically computed time budget for processing the packet. In the example of FIG. 3, this occurs before the primary path 102a saves state data for phase "5".

As shown in FIG. 4, the secondary path 102b can pick up packet processing approximately where the primary path 102a left off by accessing state data 104 saved by the primary path 102a. In this case, the secondary path 102b can determine the last phase, "4", completed by the first path 102a and can proceed with subsequent phases (e.g., "5", "6"), if necessary.

While saving state data for the phases can preserve the bulk of processing efforts, potentially, the secondary path 102b may repeat some processing performed by the primary path 102a. For example, the primary path 102a may be in the middle of phase "5" when a signal arrives indicating the packet should be moved to a different path. Since the primary path 102a may not have determined or saved phase state information for phase "5", the secondary path 102b may start phase "5" from the beginning.

Figure 5:
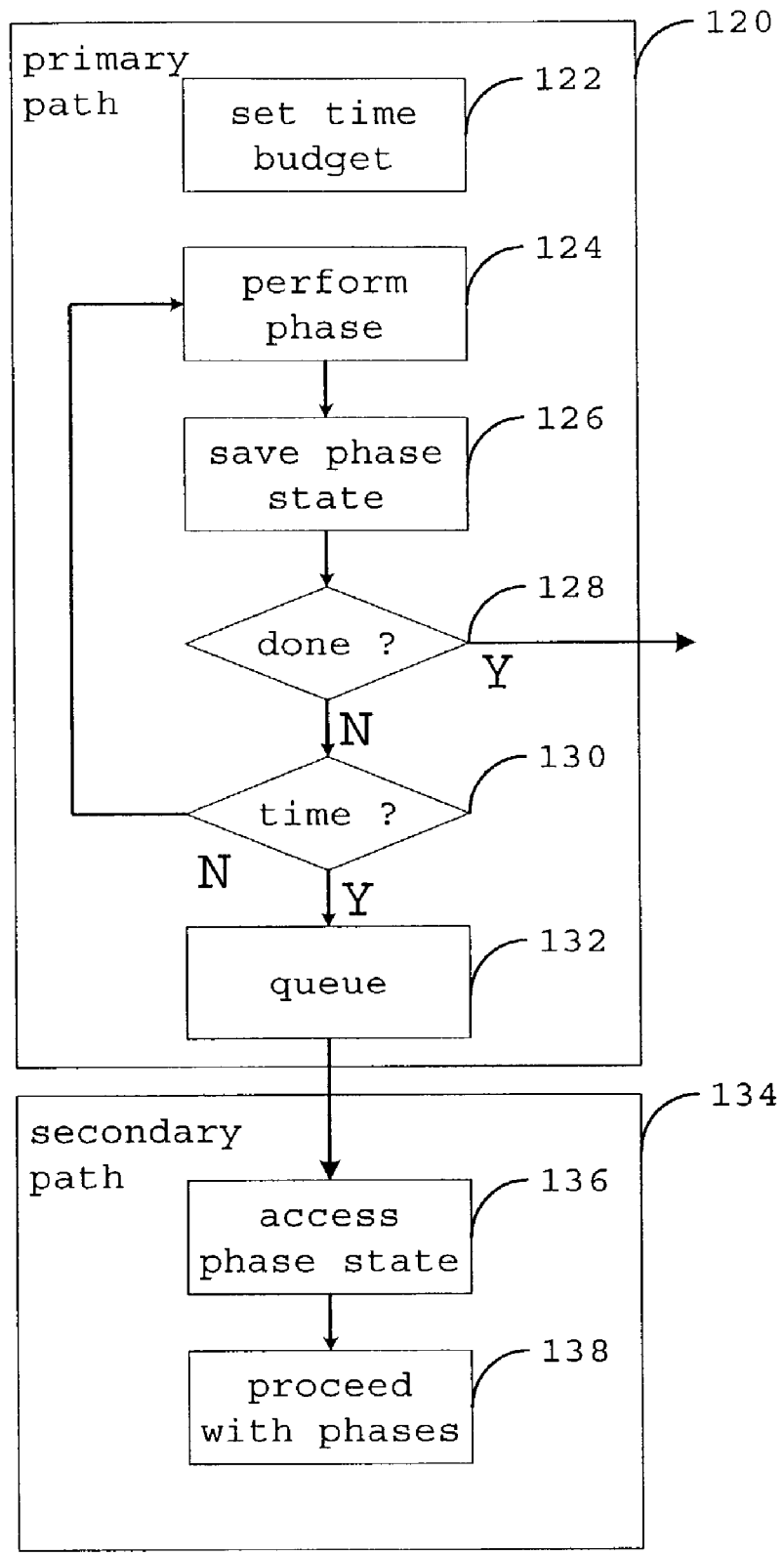
FIG. 5 is a flowchart of a process that coordinates the packet processing of different processing paths.

FIG. 5 illustrates coordination of different paths 120, 134 using packet processing phases. As shown, the primary path 120 may determine 122 a time budget for processing a packet. Such a determination 122 may be performed in a variety of ways and according to different factors. For example, a time budget may be computed 122 according to:

budget=(packet arrival frequency)×(# threads handling received packets).

As an example, if a new packet arrives every 57μ-seconds and a device features eight "fast path" threads, the time budget for a given "fast path" thread to process a packet would be 456μ-seconds. A larger budget could result in a backlog of packets awaiting processing by a "fast path" thread.

The determination 122 of a time budget may be performed dynamically (as shown) to respond to current conditions. Alternately, the determination may be performed intermittently or the time budget may be provisioned to a fixed value. After computing 122 the time budget, the path 120 can request a signal indicating this budget has elapsed (e.g., current time+time budget).

As shown in FIG. 5, the path 120 performs 124 phases and saves 126 the corresponding phase data until the path 120 finishes 128 the phases, the time budget elapses 130, or some other event occurs. If the path 120 does not finish 128 the phases within the time budget 130, the path 120 can queue 132 an entry for the packet for processing by the secondary path 134. This entry may include the state data or a reference to where the state data is stored. When the secondary path 134 pulls the entry from the queue, the path 134 can access 136 the phase state data to determine the last phase performed by the primary path 120 and use the state data 104 to proceed 138 from there. For example, the secondary path 134 may check a phase identifier (e.g., a number) stored in the state data and begin with a subsequent phase.

To define the different packet processing phases, packet processing software can include instructions that save phase state information. For example, FIG. 6 depicts source code for a program 110 that includes instructions 112a, 112b that store state data for different phases. For instance, as shown, a "GetPacket" routine saves state data 112a that includes the number of the port receiving the packet, the address of the packet in memory, the link layer type of packet (e.g., ATM (Asynchronous Transfer Mode), Ethernet, or Frame Relay), and an identifier of the phase (e.g., phase "0"). Similarly, a "HashLayer2" routine saves state data 112b that includes the hash value derived from the packet's link layer header along with a phase identifier of "1". As illustrated, the end of a phase (e.g., when phase state data is saved) need not coincide with the end of a particular software routine.

In technical terms, the state data is stored as elements of a data structure. For example, a data structure known as a "union" can be used to accommodate the different state data elements for the different phases. However, a wide variety of other software instructions/data structures may be used to save state data. For example, instead of an element of a data structure or member of an object, state data may be saved as a collection of tagged elements (e.g., "<L2 TYPE>ATM"). Additionally, while the instructions shown in FIG. 6 store state data 112a, 112b en masse, this need not be so. For example, a path may save different pieces of state data as they are determined. This gradual accumulation of state data, however, may place a greater burden on the next path 102b processing the packet to determine where the previous path 102a left off.

FIGS. 7A–7D illustrate a sample collection of packet processing phases 142–168. As shown, the phases 142–168 feature an identifier (e.g., a number) and a listing of state data stored for the phase. As illustrated, the different phases 142–168 save different amounts of state data, though there is some overlap between different phases. This variability can reduce the amount of data saved by a particular state.

While FIG. 7A–7D illustrates a particular collection of phases, the same set of packet processing operations could be divided into a different collection that may include more or fewer phases and features different state data. Additionally, other packet processing operations will typically yield a very different set of phases.

In the example shown, after a new packet arrives over a network interface and is assembled in memory, phase "0" 142 ("Get Packet") computes a time budget for processing the packet and requests a timer signal when the time budget expires. In addition, phase "0" 142 can identify the packet's arrival port, the address of the packet in memory, and the link layer type of the packet (e.g., ATM, Ethernet, or Frame Relay). This information may be saved as phase state information for phase "0" 142.

Phase "1" 144 ("Verify L2") verifies the values of the link layer header based on the type determined in phase "0" 142. For example, for Ethernet packet's, phase "1" 144 can verify that the Ethernet destination address of the packet matches the Ethernet address of the receiving device and that a checksum included in the packet is correct. As shown, based on the success of the different verification procedures, phase "1" 144 can include an exception code in the state data.

If verification succeeds, the next phases (146–148) can lookup information associated with the link layer source and/or destination addresses. This information can include policies and/or filters that indicate how to handle the packet. For example, a filter can identify packets to drop based on their origination.

As described above, a lookup may form a variable duration operation. Before returning to a description of the different phases shown in FIG. 7, FIG. 8 illustrates an example of how a lookup can be partitioned into different phases. As shown in FIG. 8, a lookup table 170 can include table entries 170b for different lookup values 174. A lookup value 174 may be based on information included in a packet (e.g., a combination of header fields) and/or the results of a hash operation upon such information. The hash may be, for example, the remainder of a division of a concatenation of header fields by a prime number.

As shown, to speed access to the entries 170b, the table 170 features a lookup index 170a that identifies the location of an entry associated with a lookup value 174. The index 170a features a collection of index tables 172a –172c. A given index table 172a –172c can feature entries for a subset of bits in the lookup value 174. For example, a primary index table 172a can include entries for different values of the first n-bits (e.g., the first 8-bits) of the lookup value 174. For instance, the primary index table 172a may include an entry for "0000000", "00000001", and so forth up to "11111111".

Potentially, the n-bits of the lookup value are enough to uniquely identify a lookup value 174 (e.g., no other lookup value shares the same values of the first 8-bits). If so, as shown, the index table 172 can include a reference 178 (illustrated as a solid arrowed line), such as a pointer, to the corresponding entry.

However, if more than one lookup value 174 shares the same n-bits, a "collision" occurs. For example, a lookup value of "000000001111" and "000000000000" share the same first eight bits (underlined). For lookup values identified as collisions 174, the index table 172a identifies (depicted as a dashed arrow) another index table 172b, 172c than can operate on a different set of lookup value 110 bits (e.g., the next m-bits). For example, the first row of table 172a identifies index table 172b as the next table to access for lookup values starting "00000000" while the second row of table 172a identifies index table 172c as the next table to access for lookup values starting "00000001".

Secondary index tables 172b, 172c, in turn, may operate on the next m-bits of the lookup value 174, in this example bits nine to twelve. Again, like the primary index table 172a, subsequent index tables 172b, 172c can identify collisions 118. For example, different lookup values may share the same m-bits in addition to the same n-bits. In such cases, still more index tables (not shown) may be used to resolve collisions. In general, a lookup will continue until an index table 172 entry is found that is not marked as a collision.

The index tables 172 form tiers. For example, table 172a forms tier 1, while tables 172b, 172c fall within tier 2. The number of tiers accessed for a particular lookup value 174 may vary.

For example, an index entry not having a collision may be identified right off the bat using index table 172a. Other lookups may not complete until many tiers later. One approach, among many, to dividing the lookup process into phases allocates a phase for each index table 172 tier. For instance, after searching index table 172a (tier 1) for a value and encountering a collision, state data could include the next index table to be searched and the portion of the lookup value 174 remaining.

The technique described above permits partial performance of a lookup by one path and its completion by another. However, other lookup schemes may also be segmented to provide a similar capability.

Returning to FIG. 7A, phase "2" ("L2 Hash") 146 can perform a hash operation on a combination of the link layer source and destination addresses. The results of the hash may be saved as state data for phase 146. Lookup phases "3" to "7", 148a –148n can use the table index (170 in FIG. 8) to search for the hash value determined in phase "2". The state data for these phases 148a –148n can include a reference to the current index table 172, a reference to a table entry 170b, the hash value 174, and/or remainder of the hash value not yet used in the lookup operation.

Figure 7A:
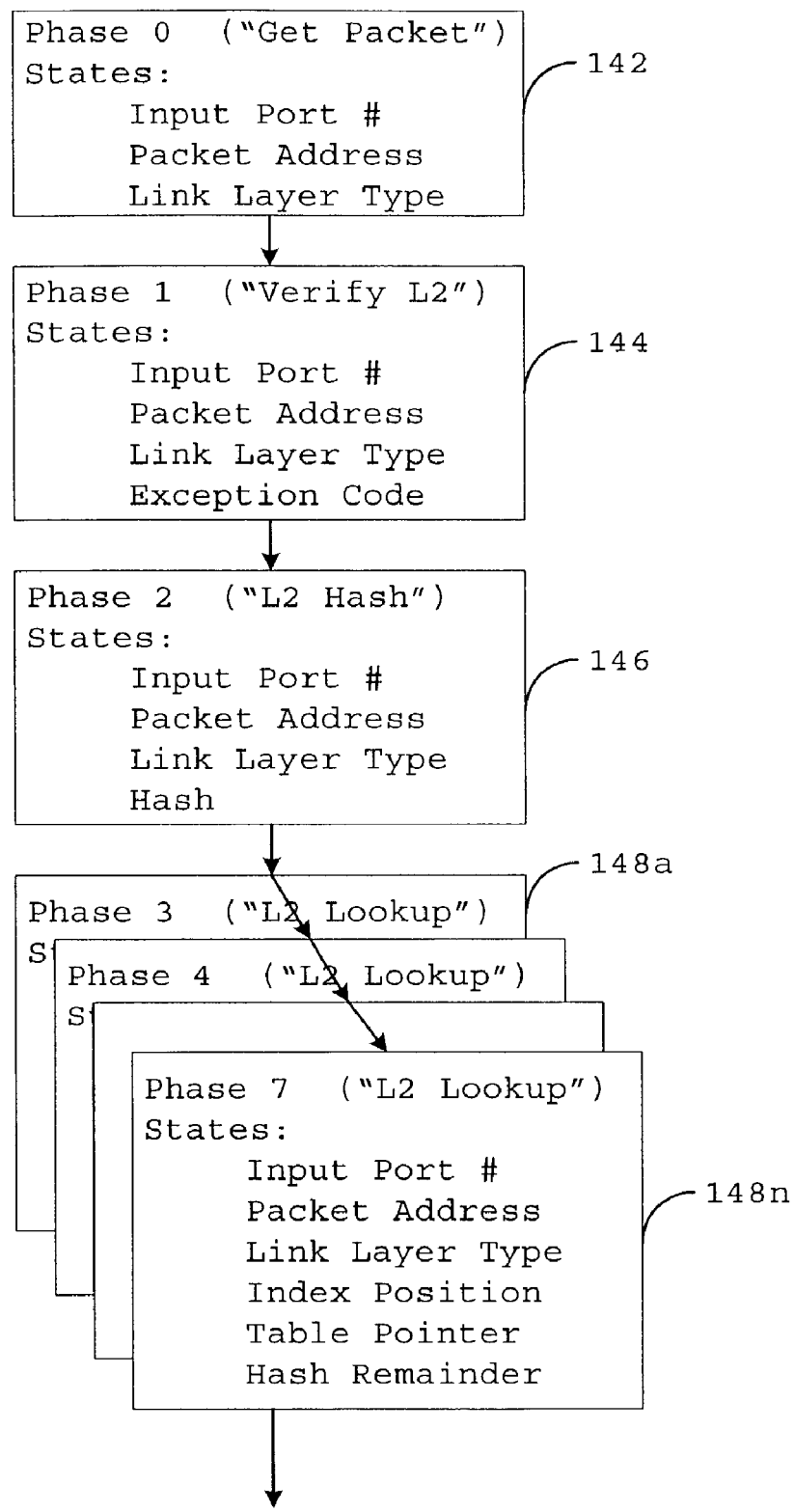
FIG. 7 is a flowchart of packet processing phases.
Figure 7B:
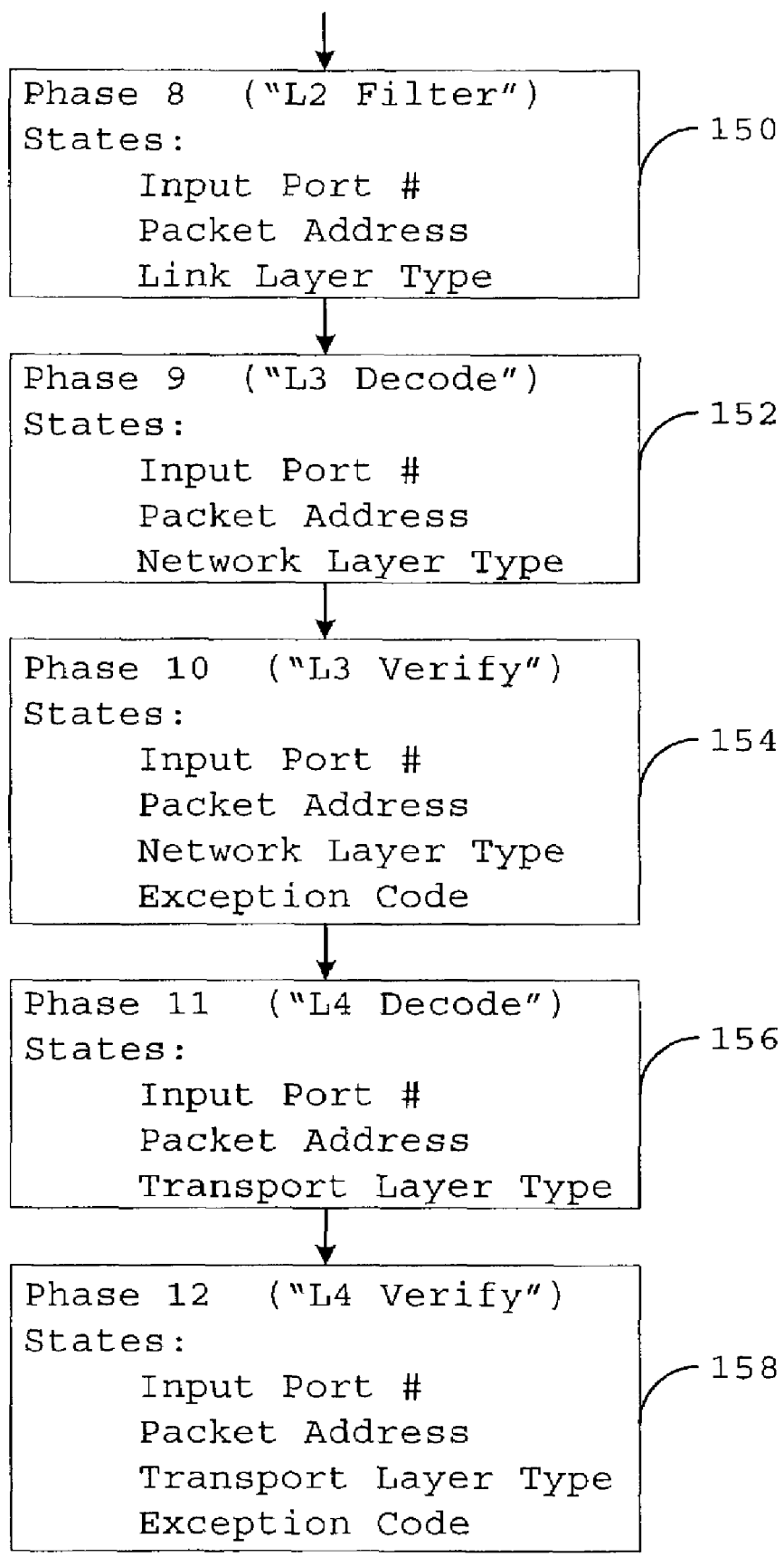
Figure 8:
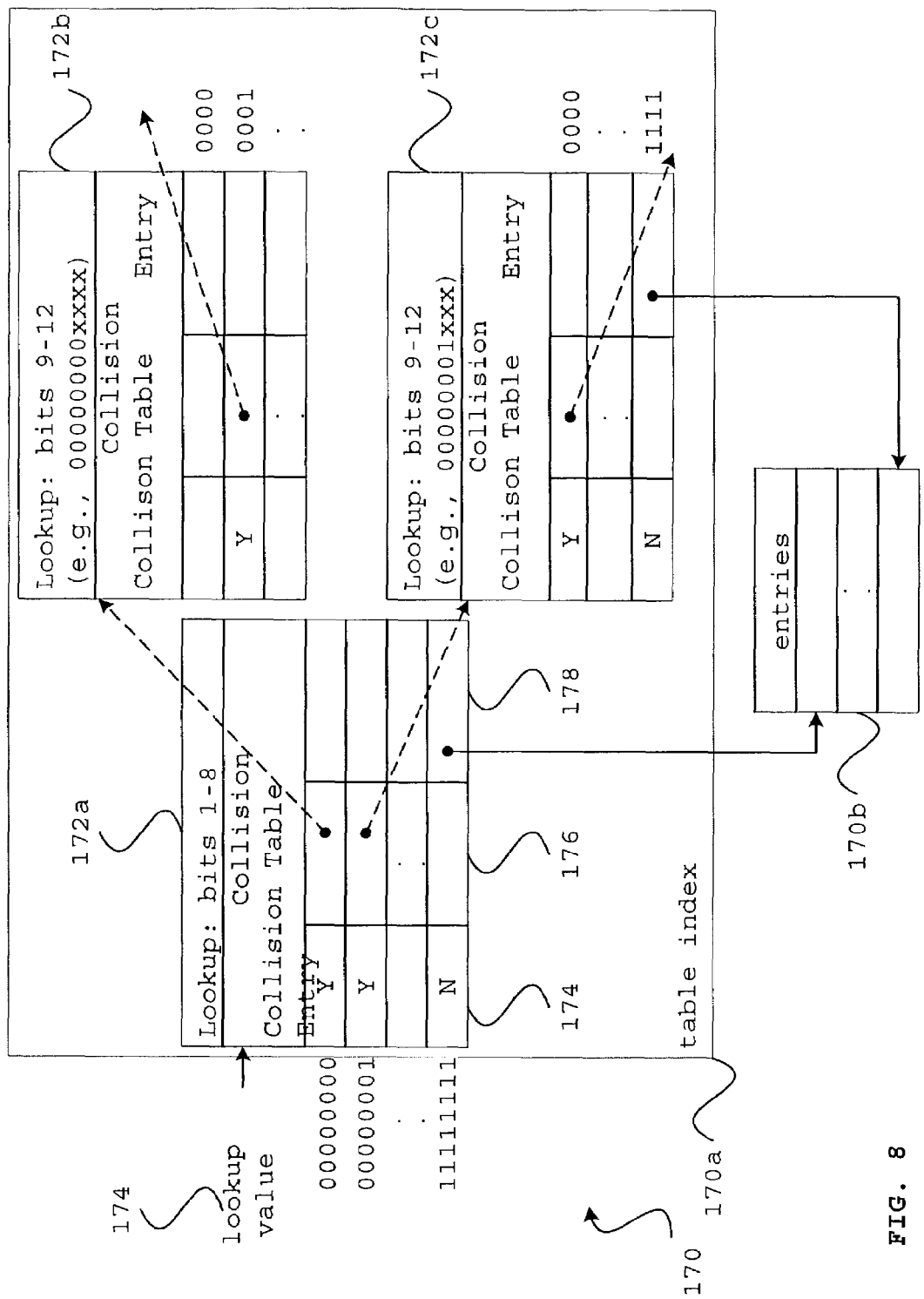
FIG. 8 is a diagram illustrating a lookup scheme.

In FIG. 7B, phase "8" 150 ("L2 Filtering") uses the results of the lookup 148a –148n to apply policies to the packet. For example, the phase 150 may discard the packet or send the packet to an exception stack based on the packet's source port and/or protocol. The state information for the phase 150 can include an exception code assigned by an applicable policy. Phases "9" to "12" 152–158 decode and verify the packet headers of different layers. In particular, phase "9" ("Decode L3") 152 determines the packet's network layer type (e.g., IP (Internet Protocol), ARP (Address Resolution Protocol), ICMP (Internet Control Message Protocol), and so forth) and saves the type as state data. Next, phase "10" 154, "Verify L3", verifies the network layer header, for example, to identify "martian addresses" that may not be forwarded or other improperly formed network addresses. The state data for this phase 152 can include verification exception codes.

Phase "11" 156, "Decode L4", and phase "12" 158, "Verify L4", operate much like phases "9" 156 and "10" 158 though on information associated with the transport layer ("layer 4") instead of layer 3. Thus, phase "11" 156 determines the transport packet type (e.g., TCP/IP (Transmission Control Protocol/Internet Protocol) or UDP/IP (User Datagram Protocol/Internet Protocol) while phase "12" 158 verifies the layer 4 header.

Figure 7C:
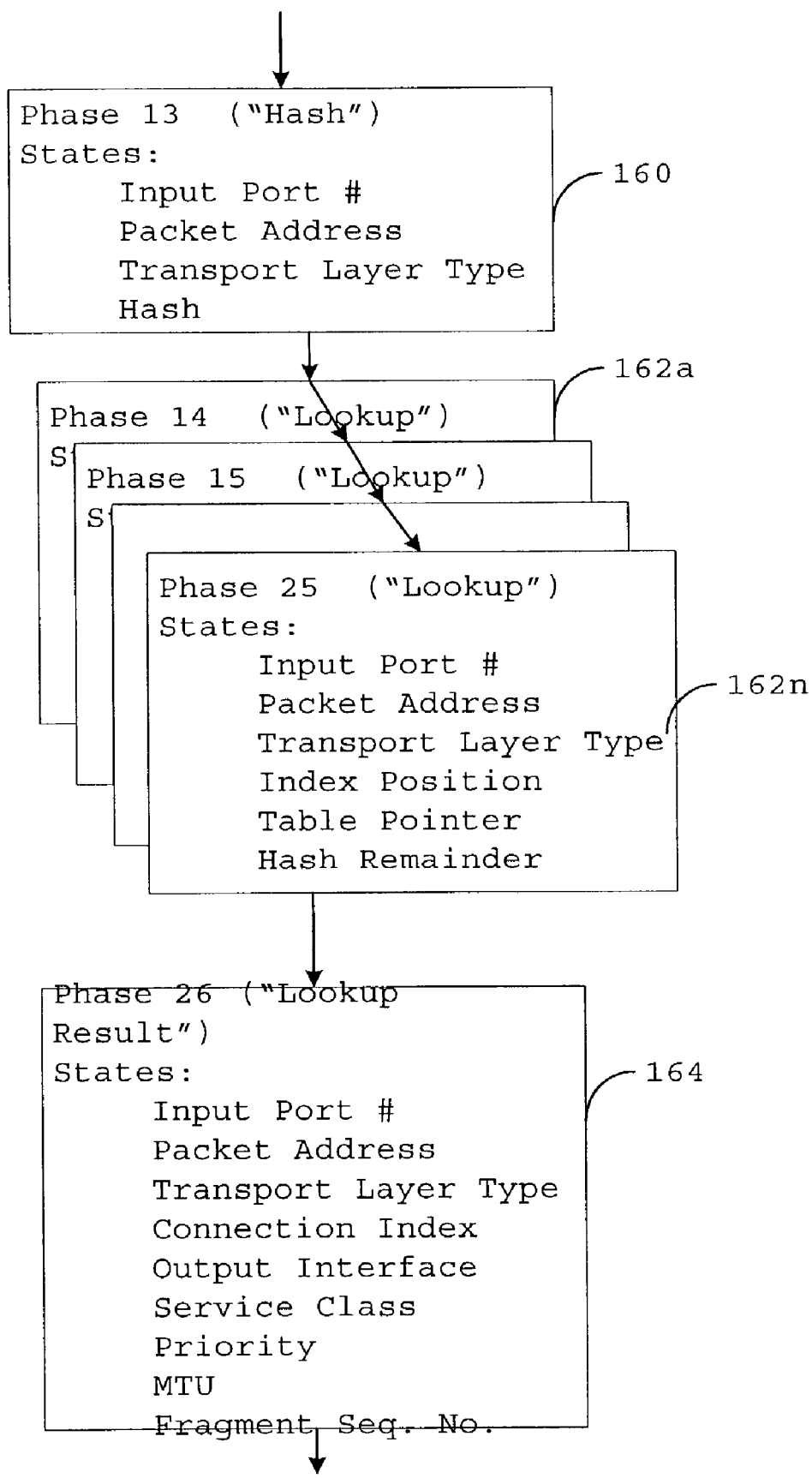
Figure 7D:
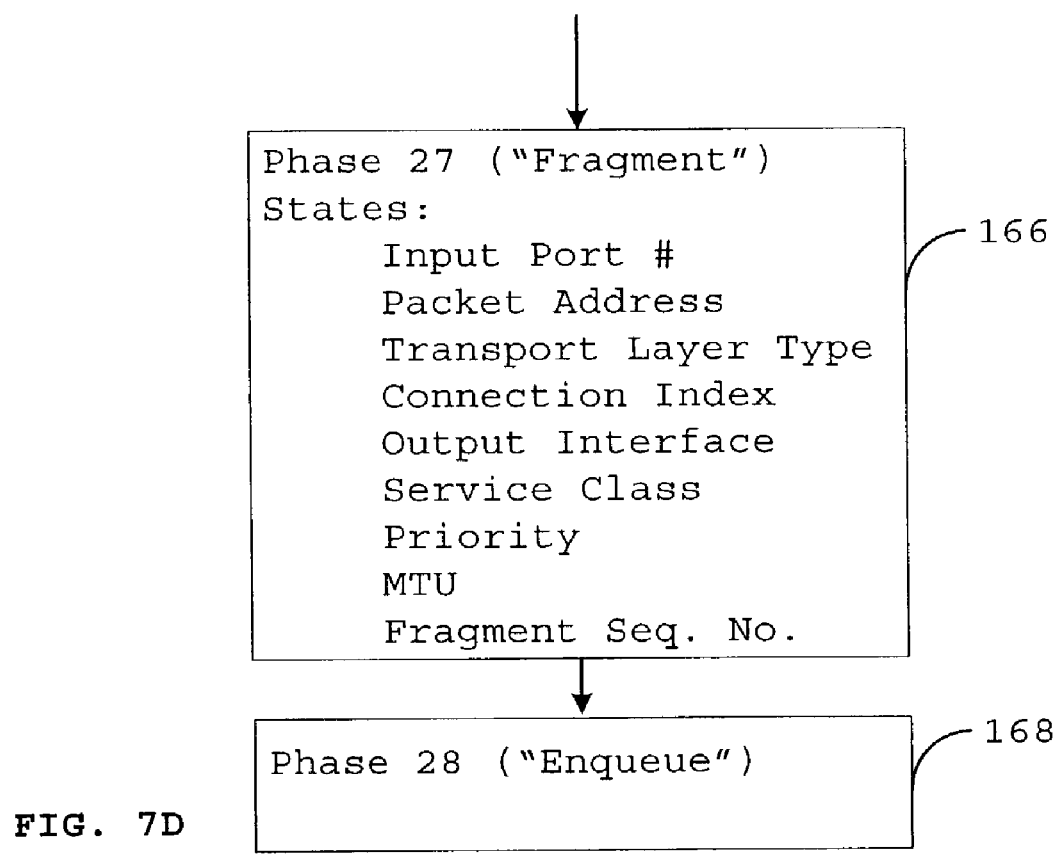

In FIG. 7C, phases "13" to "25" 160–162 perform a lookup of a hash (phase "13") of a combination of a packet's source and destination IP addresses, source and destination ports, and network protocol to determine connection information such as the output interface that will be used to forward the packet, the quality of service, the priority class, the maximum transmission unit size, and so forth. This lookup may also use the scheme shown in FIG. 8. That is, different phases "14" to "25" 162 may correspond to searches within different lookup indices (e.g., 172). Phase "26" 164 ("Lookup Result") retrieves the table entry (e.g., 170b ) identified by the lookup 162.

Phase "27" 166 ("Fragment") determines whether the packet exceeds the maximum transmission unit size for a particular outgoing interface. If so, the phase 166 can decompose the packet into smaller sequence of packet fragments. Finally, phase "28" 168 ("Enqueue") queues the packet for transmission to its destination.

Figure 9:
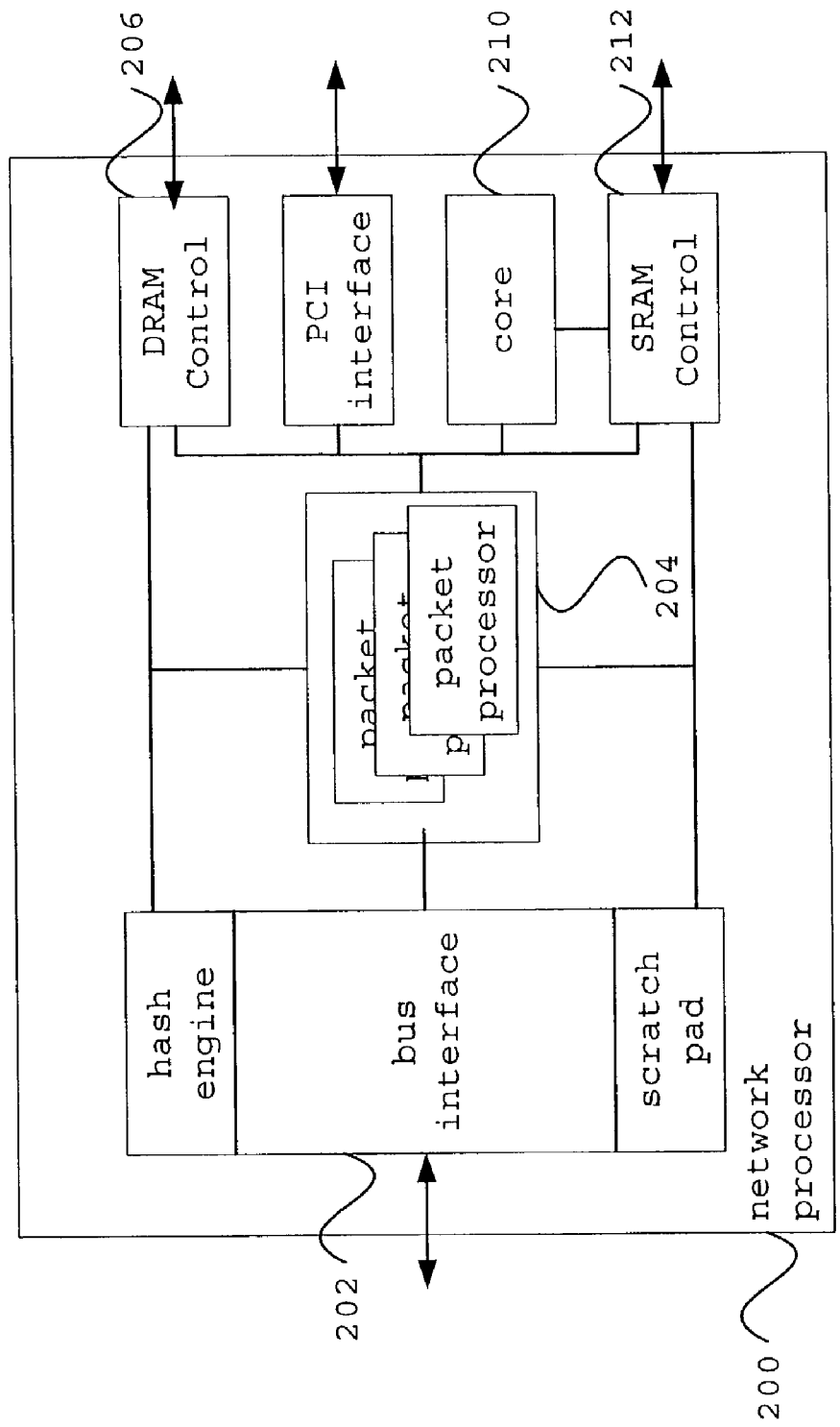
FIG. 9 is a diagram of a network processor.

To provide an example of a device programmed to implement the techniques describe above, FIG. 9 depicts a schematic of a single-chip network processor 200. The network processor 200 shown in FIG. 9 is an example of an IXP (Internet eXchange network Processor) network processor sold by Intel® Corporation. Other network processors feature different architectures than the IXP example described above.

As shown, the network processor 200 includes multiple packet processors 204. A packet processor 204 is generally a software programmable Reduced Instruction Set Computer (RISC) processor featuring an architecture optimized for common packet processing tasks (e.g., bit manipulation). These processors typically lack instructions seldom used in packet processing such as floating-point operations, integer multiplication and division, and so forth. A packet processor 204 may be designed for multithreaded operation, for example, by having hardware registers designated for different threads. The packet processor 204 may quickly switch between different threads. This can permit a packet processor 204 to process multiple packets efficiently, for example, by using different threads to process different packets.

In addition to the packet processors 204, the network processor 200 can also include a "core" processor 210. The core processor 210 may be a general purpose CPU programmed to assist the packet processors 204 when needed and handle "control plane" tasks such as updating routing tables or other "housekeeping" tasks associated with different network protocols.

The network processor 200 shown also includes a bus interface 202 for communicating (e.g., sending and receiving packets) with other network components via a collection of ports.

The processor also includes interfaces 206, 212 for accessing off-chip memory such as SRAM (Static Random Access Memory) and DRAM (Dynamic Random Access Memory) chips.

The network processor 200 may be programmed to use the techniques described above in a variety of ways. For example, the primary and secondary paths may be provided by threads operating on the packet processors 204 and core 210, respectively. Alternately, the core 210 need not be involved (e.g., the slow and fast paths may be different threads of packet processor(s) 204).

Figure 10:
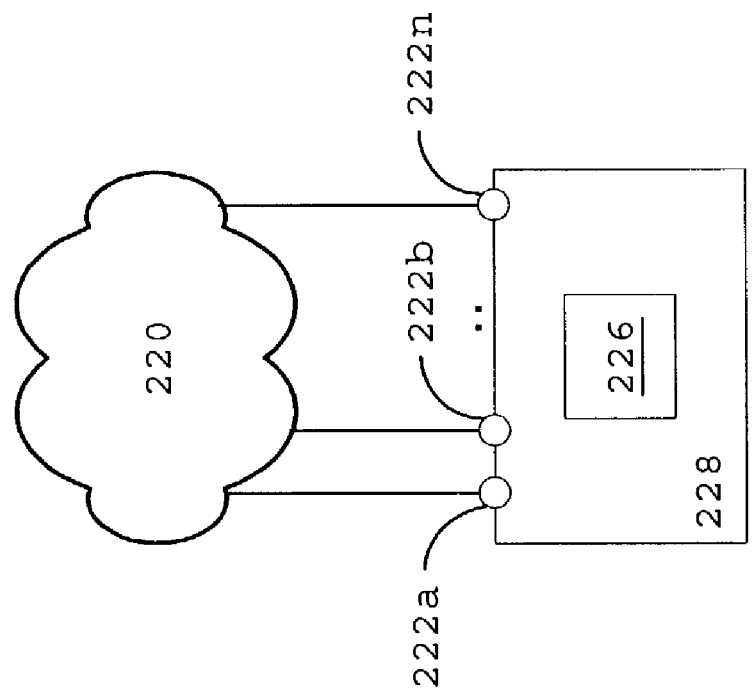
FIG. 10 is a diagram of a network device.

FIG. 10 illustrates a network device 228 that can implement the scheme described above. As shown, the device 228 features a collection of communication ports 222a –222n for communicating with other network 220 devices via transmission mediums (e.g., copper, optic cables, and/or wireless transmission) used by the ports 222a –222n. The device 228 also includes one or more medium access control (MAC) devices for handling data transmission over the transmission mediums (e.g., an Ethernet or SONET MAC controller). As shown the device 228 also includes a processing block 226 that can process a packet received via the communication ports 222a –222n and MAC devices using the approach described above. The processing block may include a network processor (e.g., the processor illustrated in FIG. 9) or may include other packet processing elements.

The techniques described herein may be implemented using a wide variety of hardware and/or software configurations. Preferably, the techniques are implemented in computer programs such as a high level procedural or object oriented programming language. However, the program(s) can be implemented in assembly or machine language if desired. The language may be compiled or interpreted. Additionally, these techniques may be used in a wide variety of networking environments. While the description used the terminology of the OSI (Open Software Institute) network model, these techniques may be used in conjunction with a wide variety of network communication schemes (e.g., TCP/IP) and a wide variety of network protocols.

Other embodiments are within the scope of the following claims.

What is claimed is:

1. A method of processing a network packets received at a network device, the method comprising:
   in a first packet processing path:
      performing at least one of a collection of packet processing phases upon a network packet, respective ones of the packet processing phases associated with respective packet processing phase identifiers;
      storing state data for the network packet, the state data including at least one of the respective packet processing phase identifiers; and
   in a second packet processing path:
      accessing the at least one of the respective packet processing phase identifiers stored in the state data for the network packet stored by the first path; and
      based on the accessed at least one of the respective packet processing phase identifiers stored in the state data, determining a phase in the collection of packet processing phases to perform next;
   wherein the packet processing phase identifiers accessed by the second packet processing path have different values for successive packets.

2. The method of claim 1, further comprising, after determining a phase to perform next, proceeding with the performance of the collection of phases.

3. The method of claim 1,
   wherein performing at least one of a collection of packet processing phases upon the network packet comprises performing more than one phase; and
   wherein storing state data comprises storing state data for each phase.

4. The method of claim 1, wherein different phases feature different sets of state data.

5. The method of claim 1, wherein the phases comprise at least one of the following: verifying at least a portion of the packet's header(s) and determining how to forward the packet.

6. The method of claim 1, wherein a subset of the phases are conditionally performed.

7. The method of claim 6, wherein the subset of phases comprise a lookup operation.

8. The method of claim 1, further comprising defining the collection of packet processing phases.

9. The method of claim 8, wherein defining the collection of packet processing phases comprises including instructions that identify state data.

10. The method of claim 1, further comprising,
    at the first processing path, determining that a time budget for processing by the first packet processing path has expired based on a comparison of the time budget and an elapsed amount of time processing the network packet.

11. The method of claim 1, wherein the first and second paths comprise paths provided by different, respective, threads.

12. The method of claim 1, wherein the first and second paths comprise paths provided by different, respective, processors.

13. The method of claim 1, wherein the device comprises a network processor.

14. The method of claim 13, wherein the packet processor comprises a packet processor having an instruction set that does not feature floating point operation instructions.

15. The method of claim 13, wherein the network processor comprises multiple programmable packet processors.

16. The method of claim 1, wherein determining which phase to perform next comprises determining the last phase completed by the first path.

17. The method of claim 1, wherein the phases are numbered sequentially based on a worst-case traversal of the collection of phases.

18. A computer readable medium, for processing a network packet received at a network device, the computer readable medium including, computer executable instructions for causing a computer to: access, at a second packet processing path, state data stored by a first packet processing path for the network packet, the state date for the network packet including a packet processing phase identifier identifying one of a collection of packet processing phases; and based on the accessed packet processing phase identifier stored in the state data for the network packet, determining a packet processing phase in the collection of packet processing phases to perform next for the network packet by the second packet processing path; wherein packet processing phase identifiers accessed by the second packet processing path have different values for successive network packets.

19. The computer readable medium of claim 18, further comprising instructions for causing the processor to, after determining a phase to perform next, proceed with the performance of the collection of phases.

20. The computer readable medium of claim 18, wherein different phases feature different sets of state data.

21. The computer readable medium of claim 18, wherein the phases comprise at least one of the following: verifying at least a portion of the packet's header(s) and determining how to forward the packet.

22. The computer readable medium of claim 18, wherein a subset of the phases are conditionally performed.

23. The computer readable medium of claim 22, wherein the subset of phases comprise a lookup operation.

24. The computer readable medium of claim 18, wherein the program comprises instructions for programming a programmable packet processor.

25. A system for processing a network packet received at a network device, the system comprising:
    at least one communication port;
    at least one Ethernet MAC (Medium Access Control) device coupled to at least one of the at least one communication ports;
    at least one processor; and
    instructions for causing at least one of the at least one processors to process a network packet received via a one of the at least one communication ports and a one of the at least one Ethernet MAC controllers, the instructions for causing the at least one processor to:
        in a first path:
            perform at least one of a collection of packet processing phases upon the network packet;
            store state data for the at least one of the collection of phases; and
        in a second path:
            access the state data stored by the first path; and
            based on the accessed state data, determine a phase in the collection of phases to perform next.

26. The system of claim 25, wherein the at least one processor comprises more than one programmable packet processors having instructions sets that do not feature floating point operation instructions.

27. The system of claim 25, wherein the state data comprises an identifier of the phase and wherein determining a phase to perform next comprises determining a phase based on the identifier.

28. The system of claim 25, wherein the phases comprises phases that perform at least one of the following operations: a lookup based on information included in the packet header(s) and verification of at least one header.

* * * * *